Sept. 29, 1959     F. H. WENDEL     2,906,228

HIGH-SPEED VESSEL

Filed April 21, 1955     2 Sheets-Sheet 1

Inventor:
Friedrich Hermann
Wendel
by: Michael S. Striker
Attorney

Sept. 29, 1959 — F. H. WENDEL — 2,906,228
HIGH-SPEED VESSEL
Filed April 21, 1955
2 Sheets-Sheet 2
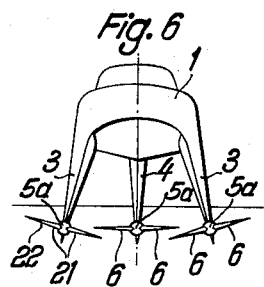
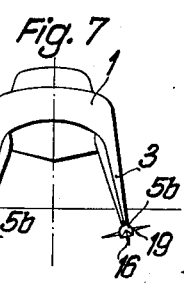
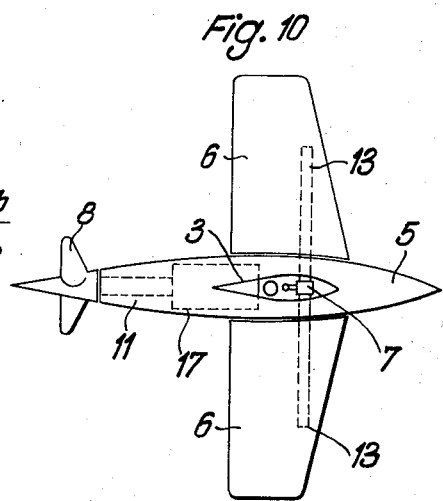
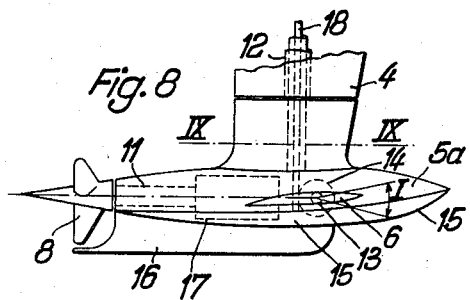
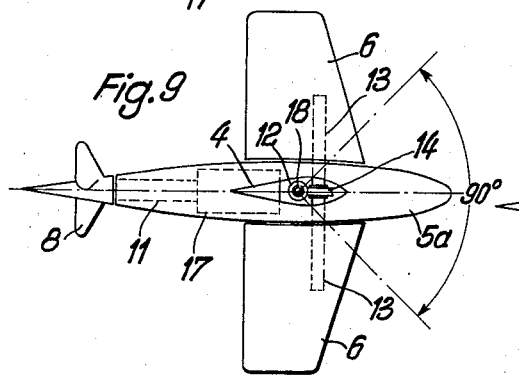
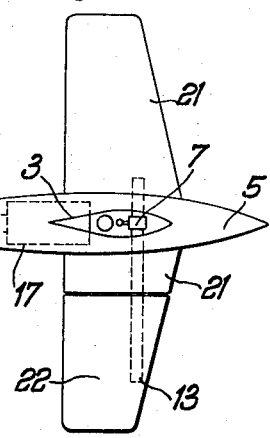
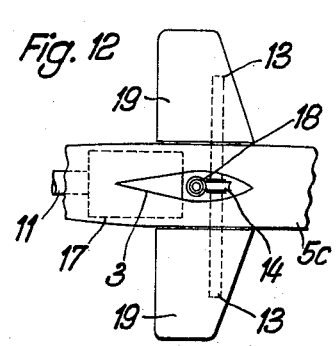
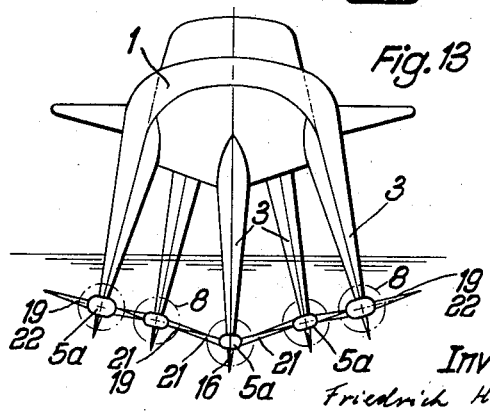
Inventor:
Friedrich Hermann Wendel
By: Michael S. Striker
Attorney United States Patent Office 2,906,228
Patented Sept. 29, 1959

2,906,228

HIGH-SPEED VESSEL

Friedrich Hermann Wendel, Hamburg-Stellingen, Germany

Application April 21, 1955, Serial No. 502,943

Claims priority, application Germany November 25, 1954

14 Claims. (Cl. 114—66.5)

The invention relates to a vessel capable of very high speeds the hull of which is hydrodynamically lifted out of the water by means of submerged bodies fitted to the hull.

It is the purpose of this invention, in particular, to create a high-speed vessel of a type not affected by rough seas and waves and which is capable of travelling smoothly and safely at high speeds without rolling or pitching even when the sea is rough.

For this purpose the invention provides for a high-speed vessel comprising a hull suited for receiving the power plants required for the propulsion and the operation of the vessel and for accommodating passengers, hollow supporting legs or struts for said hull, and elongated submerged hydrofoil bodies secured to the struts and suited for holding propelling means actuated by said power plants for the propulsion of the vessel and the control gear of said vessel. The submerged bodies are fitted with submerged hydrofoils whose angle of incidence can be adjusted. Preferably, means are provided for transmitting the driving power of said power plants through said hollow supporting struts to said propelling means.

Additional characteristic features are indicated in the following description, the drawings, and the patent claims.

In the drawings the invention is schematically represented in several examples of execution.

In Figs. 1 to 5 five embodiments of a high-speed vessel according to the present invention are represented while the vessel is in motion.

Fig. 6 is a frontal view of the two embodiments as represented in Figures 1 and 2.

Fig. 7 is a frontal view of three embodiments as represented in Figs. 3 to 5.

Fig. 8 represents, in a side elevation on a larger scale, a section of the rear supporting strut of the vessel with its submerged hydrofoil body according to the embodiment of Fig. 2.

Fig. 9 is a top view of the submerged hydrofoil body fitted to the rear supporting strut as per Fig. 2, with the supporting strut being shown in cross-section along the line IX—IX of Fig. 2.

Fig. 10 is a top view on a larger scale of a submerged hydrofoil body fitted to one of the two forward supporting struts of the hull of the vessel, with the supporting strut being shown in cross-section along the line X—X of Fig. 1.

Fig. 11 is a representation corresponding to Fig. 10 of still another example of execution of the submerged hydrofoil body fitted to the right forward supporting struts of the hull of the vessel, with the supporting struts being shown in cross-section.

Fig. 12 is a top view on an enlarged scale of the submerged hydrofoil body fitted to the two rear supporting struts of the hull of the vessel according to the example of execution 4 and 5, with the supporting strut being shown in cross-section along the line XII—XII of Fig. 4.

Fig. 13 is a front view of a modified embodiment of vessel shown in Fig. 2.

Figure 1:
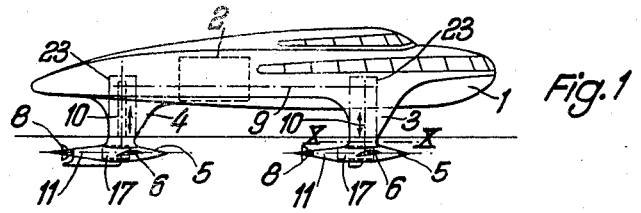
Figure 2:
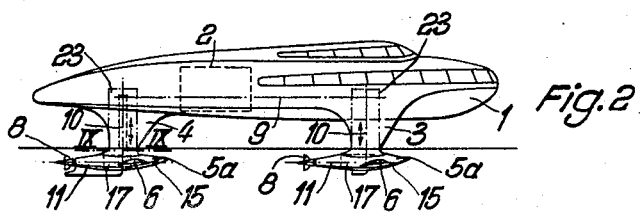

Referring to Figs. 1 and 2, the hull 1 of the high-speed vessel houses a power plant 2 which supplies the driving power for the driving means required for propelling and steering the vessel. These propelling means will be described in detail further down. The power plant 2 schematically indicated in Fig. 1 is a diesel engine. It is sufficient for high-speed vessels designed for carrying a limited number of passengers. In the case of large high-speed vessels it is preferred to use diesel-electric, turbo-electric or high-pressure steam plants. The hull 1 is of streamlined design. It has three hollow supporting legs or struts 3, 4, likewise of streamlined design; at the forward part of the hull 1, two such supporting struts 3 are provided on the port and starboard sides, respectively, and at the stern, arranged in the central longiutdinal axis of the hull, one supporting rear leg 4, is secured to the hull, as shown in Fig. 2. A horizontally arranged submerged hydrofoil body 5 or 5a is secured to each strut 3, 4. The hydrofoil bodies 5 in Fig. 1 and 5a in Fig. 2 are so designed that they ensure on account of their elongated shape a good and satisfactory running trim below the water's surface. Their diameters are so selected that the necessary driving means, gears and other elements required for propelling and controlling the vessel may be accommodated within them. This will be dealt with in detail further down. At right angles to their longitudinal axis and at the port and starboard sides, respectively, of the guide bodies, hydrofoils 6 are pivotally mounted turnable about a horizontal axis which may be controlled and positioned from the bridge in the hull 1 to change the angle of incidence. Fig. 10 represents, on a larger scale, the arrangement of the controllable hydrofoils 6 of Fig. 1. They may be positioned as required by pivoting them with their entire surface with respect to the submerged guide body 5 around the axis 13. The control gear actuated from the bridge in the hull 1 is schematically represented as toothed-wheel gear 14 and/or as lever system 7 by means of which the hydrofoils may be turned within an angle of incidence I marked in Fig. 8 around their horizontal axis 13. Every submerged hydrofoil body 5 (5a) is fitted with means for propelling the high-speed vessel, e.g. a propeller 8 driven from the power plant 2 by way of schematically represented shafts, gears, couplings 9, 10, 11, etc. The two submerged hydrofoil bodies at the bow of the vessel are firmly attached to their supporting struts 3 whereas the rear submerged hydrofoil body is pivotally mounted on a vertical shaft 12 provided in its supporting strut so as to permit a change of direction of the vessel by way of the slip stream of the propeller, as shown on a larger scale in Fig. 8, by turning the rear submerged body 5 (5a) either way within an angle of about 90°, as shown in Fig. 9.

In Fig. 1 and likewise in Figs. 2 to 5 the vessel is represented in motion and it may easily be seen that the hull 1 is lifted out of the water in its entirety and is supported by the hydrofoil bodies 5 and by hydrofoils 6 which are submerged in the water. The height of the hull 1 above the surface of the water may be adjusted by regulating the number of revolutions of the driving propellers 8, or, with other words, by the speed of the vessel, and by a variation of the angle of incidence of the submerged wings or foils. Likewise any lateral heeling of the vessel caused by wind or weight displacements within the hull may be compensated for by an adequate positioning of the controllable wings or foils. A high-speed vessel designed in accordance with the present invention is therefore no longer influenced by the motion of the water's surface, even if rough seas should prevail. While at rest the high-speed vessel is submerged like any other vessel of common design with its hull 1 down to its water line.

In the embodiment of Figs. 2, 8 and 9 the elongated submerged hydrofoil bodies 5a are so designed that they create an additional hydrodynamic uplift. To achieve that the bottom surfaces 15 of the submerged hydrofoil bodies rise gradually towards the front end of the guide bodies at a suitable angle of incidence as is shown in Fig. 8 and have unsymmetrical top and bottom surfaces. On account of this design the surfaces of the hydrofoil bodies 5a are being imparted the properties of a longitudinal hydrofoil.

In this embodiment, the propellers 8 and the control gear elements 14 or 7 actuating the hydrofoils 6 are driven from electric motors 17 and 18 to which electric power is fed from the power plant 2 installed in the hull by way of cables led through the hollow struts 3 and 4.

In very large high-speed vessels according to the present invention, the submerged hydrofoil bodies will be designed to permit the installation of the power plants and the propelling means in their entirety within the submerged bodies.

In view of the fact that in this example of execution the submerged bodies 5a are designed as longitudinal hydrofoil bodies, the controllable hydrofoils 6 may be made smaller giving proper consideration to the uplift contributed by the longitudinal hydrofoil bodies. A vertical fin 16 is provided at the bottom 15 of the submerged body 5a and serves as protection for the propeller and as docking keel, as shown in Fig. 8. For the rest this example of execution is fundamentally similar in its design to that represented in Figs. 1 and 6.

Should three supporting legs prove insufficient in number for stress and strength factor considerations in view of the size of the projected vessels it will obviously be possible to fit the hull with four or five supporting struts. Fig. 13 shows a modified embodiment with three struts in front, and two struts in the rear.

Figure 3:
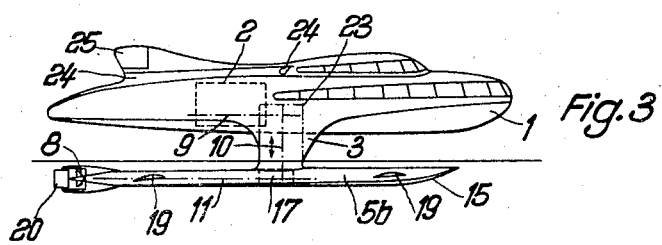

The embodiment of Figs. 3 and 7 shows a high-speed vessel designed for very high speeds. For this design the length of the submerged bodies must be approximately equivalent to 70% of the (total) length of the vessel. In this case the submerged bodies 5b, 5c, and 5d, respectively, are longitudinal hydrofoil bodies as has been described above with reference to Figs. 2 and 8. One such submerged hydrofoil body is arranged on the port and starboard side, respectively, of the hull of the vessel, each submerged hydrofoil body being connected with the hull of the vessel by means of a hollow supporting strut.

Figure 4:
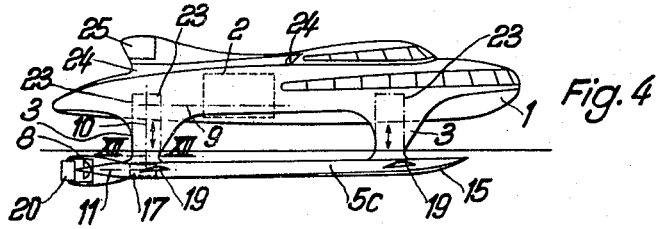

Should one supporting strut each on the port and starboard side of the hull of large vessels prove insufficient for stress and strength factor considerations it is of course possible to provide for several such supporting struts on the port and starboard side, respectively, as is shown in Fig. 4.

The long submerged longitudinal bodies 5b, 5c shown in Figs. 3 and 4 have, exactly as has been the case with the submerged bodies 5a shown in Fig. 2, a bottom surface 15 gradually rising towards the front end of the submerged longitudinal wings as shown with particular clarity in Fig. 8.

Figure 5:
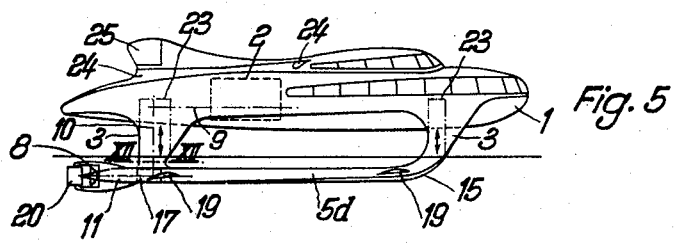

The embodiment of Fig. 5 differs from the embodiment of Figs. 3 and 4 merely in that the two submerged hydrofoil bodies 5d merge in their forward part with the supporting struts 3, so that the submerged bodies 5d and the supporting struts 3 form, in this example of execution, an integral structural member in their forward part. In this manner the longitudinal bodies are positively prevented from nosing down for any cause whatever. In the examples of execution according to Figs. 3 to 5, five short controllable transversal stub hydrofoils 19 are provided on the longitudinal bodies 5d both in front and in the rear, and are designed and arranged in a manner similar to hydrofoils 6 of the examples of execution according to Figs. 1, 2, 8 and 9. These transversal stub foils serve to regulate the height of the hull above water at cruising speed and to correct any heeling of the vessel as has been described further up. To make possible a satisfactory steering, side rudders 20 are provided at the sterns of the submerged hydrofoil bodies behind the propellers 8.

In this example of execution the power plants 2 are likewise located, in a manner similar to that described for the examples of execution according to Figs. 1 and 2, inside the hull 1 and transmit their power to the propelling and controlling means in a manner similar to that described for the examples of execution according to Figs. 1 and 2. The longitudinal hydrofoil bodies represented in Figs. 3 to 5 offer the advantage that they need not remain, when the sea is rough, underneath the lowest point of the trough of a wave but may adapt themselves to a mean wave height in relation to the residual amount of uplift produced by the parts remaining submerged in the water. The absolute running height of the hull above the surface of the water may be increased thereby in stormy weather to a corresponding extent.

Fig. 11 represents, on a larger scale and in top view, a submerged body 5 which in contrast to the submerged body according to Fig. 10 is designed in a different manner inasmuch as the right longitudinal body viewed in the direction of travel includes a part 21 firmly attached to the submerged body and another part 22 pivotally turnable around a horizontal axis 13. The submerged body on the port side at the bow of the vessel is arranged in an analogous manner but mirror-symmetrical as compared with Fig. 11 for the starboard hydrofoil body.

This type of design of the outer hydrofoil bodies may be applied, however, only at the forward supporting struts at the bow of the vessel. Portion 22 is controlled by gear 14 and/or the lever system 7 from the bridge of the vessel as has been described above.

It is possible to design the supporting struts 3 and 4 of the high-speed vessels according to Figs. 1 to 5 in such a manner that the struts may be retracted or extended telescope-fashion. This is schematically indicated at 23 in Figs. 1 to 5. This makes it possible to decrease the draught of the vessel when the latter proceeds at slow speed without being supported by the submerged bodies.

Only by the application of the arrangement of the longitudinal hydrofoil bodies according to Fig. 2 and in particular according to Figs. 3 to 5 it becomes possible to make use of above-water jets 24 without impairing in the least the safety of travel and to attain extremely high speeds. In that connection control surfaces or fins 25 may be provided to keep the vessel on a straight course.

What I claim is:

1. High speed vessel comprising, in combination, an elongated hull having a forward portion and a rear portion; supporting strut means secured to said hull and downwardly extending therefrom; a plurality of submerged hydrofoil body means secured to said strut means, said hydrofoil body means having at least two transversely spaced elongated longitudinally extending body portions located underneath the forward portion of said hull, and at least one longitudinally extending elongated body portion located underneath the rear portion of said hull, each of said body portions including unsymmetrical top and bottom surfaces unsymmetrically shaped for producing a hydrodynamic lifting force acting through said strut means on said hull whereby longitudinal stabilization is effected; and hydrofoil means secured to said hydrofoil body means adjustable for varying the angle of incidence thereof.

2. High speed vessel comprising, in combination, an elongated hull having a forward portion and a rear portion; supporting strut means secured to said hull and downwardly extending therefrom; submerged hydrofoil body means secured to said strut means, said hydrofoil body means including at least two transversely spaced elongated forwardly located hydrofoil bodies located underneath the forward portion of said hull, each of said forwardly located hydrofoil bodies having a longitudinally extending bottom surface and a longitudinally extending top surface unsymmetrical with respect to said bottom surface for producing a hydrodynamic lifting force on said forward portion of said hull, and at least one elongated rearwardly located hydrofoil body located underneath the rear portion of said hull and having a longitudinally extending bottom surface and a longitudinally extending top surface for producing a hydrodynamic lifting force on said rear portion of said hull whereby said hydrodynamic lifting forces acting through said strut means on said front and rear portions of said hull effect longitudinal stabilization; first hydrofoil means secured to said forwardly located hydrofoil bodies transversely projecting from the same; second hydrofoil means secured to said rearwardly located hydrofoil body transversely projecting from the same, at least a transverse section of said first and second hydrofoil means being turnable about a horizontal axis for adjusting the angle of incidence of said hydrofoil means.

3. High speed vessel as set forth in claim 2 wherein said supporting strut means include two forwardly located struts supporting said forwardly located hydrofoil bodies, and one rearwardly located strut arranged in the longitudinal plane of symmetry of said hull and supporting said rearwardly located hydrofoil body.

4. High speed vessel as set forth in claim 3 and including a power plant located in said hull; propulsion means located in said hydrofoil bodies; and transmission means located in said struts and connecting said power plant with said propulsion means.

5. High speed vessel as set forth in claim 4 wherein said rearwardly located hydrofoil body is mounted on said rearwardly located strut for turning movement about a vertical axis; and steering means for turning said rearwardly located hydrofoil body about said axis.

6. High speed vessel as set forth in claim 5 and including a longitudinally extending vertical fin secured to said rearwardly located hydrofoil body.

7. High speed vessel as set forth in claim 3 and including rudder means secured to said rearwardly located hydrofoil body for turning movement about a vertical axis.

8. High speed vessel comprising, in combination, an elongated hull having a forward portion and a rear portion; supporting strut means secured to said hull and downwardly extending therefrom; a pair of transversely spaced longitudinally extending elongated submerged hydrofoil bodies, each hydrofoil body having a forward portion located underneath said forward portion of said hull, and a rear portion located underneath said rear portion of said hull, each of said hydrofoil bodies having elongated longitudinally extending unsymmetrical top and bottom surfaces partly located underneath said forward portion of said hull and partly located underneath said rear portion of said hull for producing hydrodynamic lifting forces and for effecting longitudinal stabilization; and hydrofoil means projecting in opposite transverse directions from each of said forward portions and from each of said rear portions of said hydrofoil bodies and being at least partly turnable about a horizontal axis for adjusting the angle of incidence.

9. High speed vessel as set forth in claim 8 and including rudder means secured to the rear portions of said hydrofoil bodies; and vertical fin means secured to said hull and to said hydrofoil bodies.

10. High speed vessel as set forth in claim 8 wherein said supporting strut means include two forwardly located struts respectively attached to said forward portions of said hydrofoil bodies, and two rearwardly located struts respectively attached to said rear portions of said hydrofoil bodies.

11. High speed vessel as set forth in claim 10 wherein said two forwardly located struts respectively merge into said forward portions of said hydrofoil bodies, and wherein each of said two forwardly located struts has a surface merging into said longitudinally extending surface of the respective hydrofoil body for producing additional hydrodynamic lifting force.

12. High speed vessel as set forth in claim 8 wherein said hydrofoil means include four pairs of hydrofoils, each pair of hydrofoils being turnable about a horizontal axis.

13. High speed vessel as set forth in claim 8 and including propulsion means located in said hydrofoil bodies; a power plant located in said hull; and transmission means located in said strut means and connecting said power plant with said propulsion means.

14. High speed vessel comprising, in combination, an elongated hull having a forward portion and a rear portion; supporting strut means secured to said hull and downwardly extending therefrom, said supporting strut means including three forwardly located transversely spaced struts, and two rearwardly located transversely spaced struts; submerged hydrofoil body means secured to said strut means, said hydrofoil body means including three transversely spaced elongated forwardly located hydrofoil bodies located underneath the forward portion of said hull, each of said forwardly located hydrofoil bodies having a longitudinally extending bottom surface and a longitudinally extending top surface and unsymmetrical with respect to said bottom surface for producing a hydrodynamic lifting force on said forward portion of said hull, and two elongated rearwardly located hydrofoil bodies located underneath the rear portion of said hull, each having a longitudinally extending bottom surface and a longitudinally extending top surface for producing a hydrodynamic lifting force on said rear portion of said hull whereby said hydrodynamic lifting forces acting through said strut means on said front and rear portions of said hull effect longitudinal stabilization; first hydrofoil means secured to said forwardly located hydrofoil bodies transversely projecting from the same; second hydrofoil means secured to said rearwardly located hydrofoil bodies bodies transversely projecting from the same, at least a transverse section of said first and second hydrofoil means being turnable about a horizontal axis for adjusting the angle of incidence of said hydrofoil means.

References Cited in the file of this patent

UNITED STATES PATENTS

| 920,849 | Fauber | May 4, 1909 |
| 1,780,998 | Curioni | Nov. 11, 1930 |
| 1,857,347 | Beebe | May 10, 1932 |
| 2,139,303 | Grunberg | Dec. 6, 1938 |
| 2,159,410 | Turkovich | May 23, 1939 |
| 2,400,782 | Randall | May 21, 1946 |
| 2,491,541 | Woodin | Dec. 20, 1949 |

FOREIGN PATENTS

| 835 | Great Britain | of 1903 |
| 264,809 | Switzerland | Oct. 31, 1949 |
| 382,812 | Great Britain | Nov. 3, 1932 |
| 602,526 | Germany | Sept. 11, 1934 |
| 888,515 | Germany | Sept. 3, 1953 |